US011456931B1

(12) United States Patent
May et al.

(10) Patent No.: US 11,456,931 B1
(45) Date of Patent: Sep. 27, 2022

(54) SYSTEM, METHOD AND COMPUTER PROGRAM FOR ORCHESTRATING LOOSELY COUPLED SERVICES

(71) Applicant: Amdocs Development Limited, Limassol (CY)

(72) Inventors: Pavel Yefim May, Rishon leZion (IL); Vladimir Tkach, Kefar Yona (IL); Alexander Krasnostavsky, Kfar-Saba (IL); Sergey Podalov, Herzliya (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 17/223,979

(22) Filed: Apr. 6, 2021

(51) Int. Cl.
  *H04L 41/5025* (2022.01)
  *H04L 41/5054* (2022.01)
  *H04L 43/0817* (2022.01)
  *H04L 41/5009* (2022.01)
  *H04L 41/50* (2022.01)

(52) U.S. Cl.
  CPC ...... *H04L 41/5025* (2013.01); *H04L 41/5009* (2013.01); *H04L 41/5054* (2013.01); *H04L 41/5058* (2013.01); *H04L 43/0817* (2013.01)

(58) Field of Classification Search
  None
  See application file for complete search history.

(56) References Cited

U.S. PATENT DOCUMENTS

| | | | |
|---|---|---|---|
| 8,234,387 B2 * | 7/2012 | Bradley | H04L 63/0281 709/229 |
| 9,424,024 B2 | 8/2016 | Kannan et al. | |
| 9,590,872 B1 * | 3/2017 | Jagtap | H04L 41/145 |
| 9,754,303 B1 * | 9/2017 | Jagtap | G06Q 30/0621 |
| 10,599,500 B2 | 3/2020 | Caldato et al. | |
| 10,637,952 B1 | 4/2020 | Koenig et al. | |
| 2011/0295646 A1 * | 12/2011 | Barros | G06Q 10/06316 705/7.26 |
| 2013/0018703 A1 * | 1/2013 | Majeed | G06Q 10/06 705/7.38 |
| 2013/0226640 A1 * | 8/2013 | Butler | G06Q 10/063112 705/7.14 |
| 2014/0195641 A1 * | 7/2014 | Wang | H04L 67/327 709/217 |
| 2015/0143090 A1 * | 5/2015 | Deshmukh | G06F 9/44505 713/1 |
| 2017/0163742 A1 * | 6/2017 | Chou | H04L 67/10 |
| 2020/0028749 A1 * | 1/2020 | Dhandu | H04L 12/4641 |
| 2020/0329117 A1 | 10/2020 | Arbatti et al. | |
| 2020/0394062 A1 | 12/2020 | Thomas et al. | |

\* cited by examiner

*Primary Examiner* — Ranodhi Serrao
(74) *Attorney, Agent, or Firm* — Zilka-Kotab, P.C.

(57) ABSTRACT

As described herein, a system, method, and computer program are provided for orchestrating loosely coupled services. A plurality of services are registered, wherein a first service of the plurality of services is a consumer of a second service of the plurality of services. A status of each service of the plurality of services is monitored. Operation of the plurality of services is orchestrated, based on the status of each service of the plurality of services, including at least notifying the first service of a status of the second service for affecting operation of the first service.

20 Claims, 7 Drawing Sheets

SYSTEM, METHOD AND COMPUTER PROGRAM FOR ORCHESTRATING LOOSELY COUPLED SERVICES

FIELD OF THE INVENTION

The present invention relates to coordination for pooled services.

BACKGROUND

Existing techniques used for service pool coordination have very limited abilities for dynamically managing multiple services. For example, availability of a service that provides some application programming interface (API) is typically not recognized by other services that consume this API. Further, services generally do not get notified when the API becomes available or unavailable. As a result, an existing architecture will not be highly available during multiple changes in service health.

An existing Kubernetes approach for this issue is restarting dockers when any problem appears. However, restarting dockers can be a very time and resource expensive operation and is not always justified. There is thus a need for addressing these and/or other issues associated with the prior art.

SUMMARY

As described herein, a system, method, and computer program are provided for orchestrating loosely coupled services. A plurality of services are registered, wherein a first service of the plurality of services is a consumer of a second service of the plurality of services. A status of each service of the plurality of services is monitored. Operation of the plurality of services is orchestrated, based on the status of each service of the plurality of services, including at least notifying the first service of a status of the second service for affecting operation of the first service.

DETAILED DESCRIPTION

Figure 1:
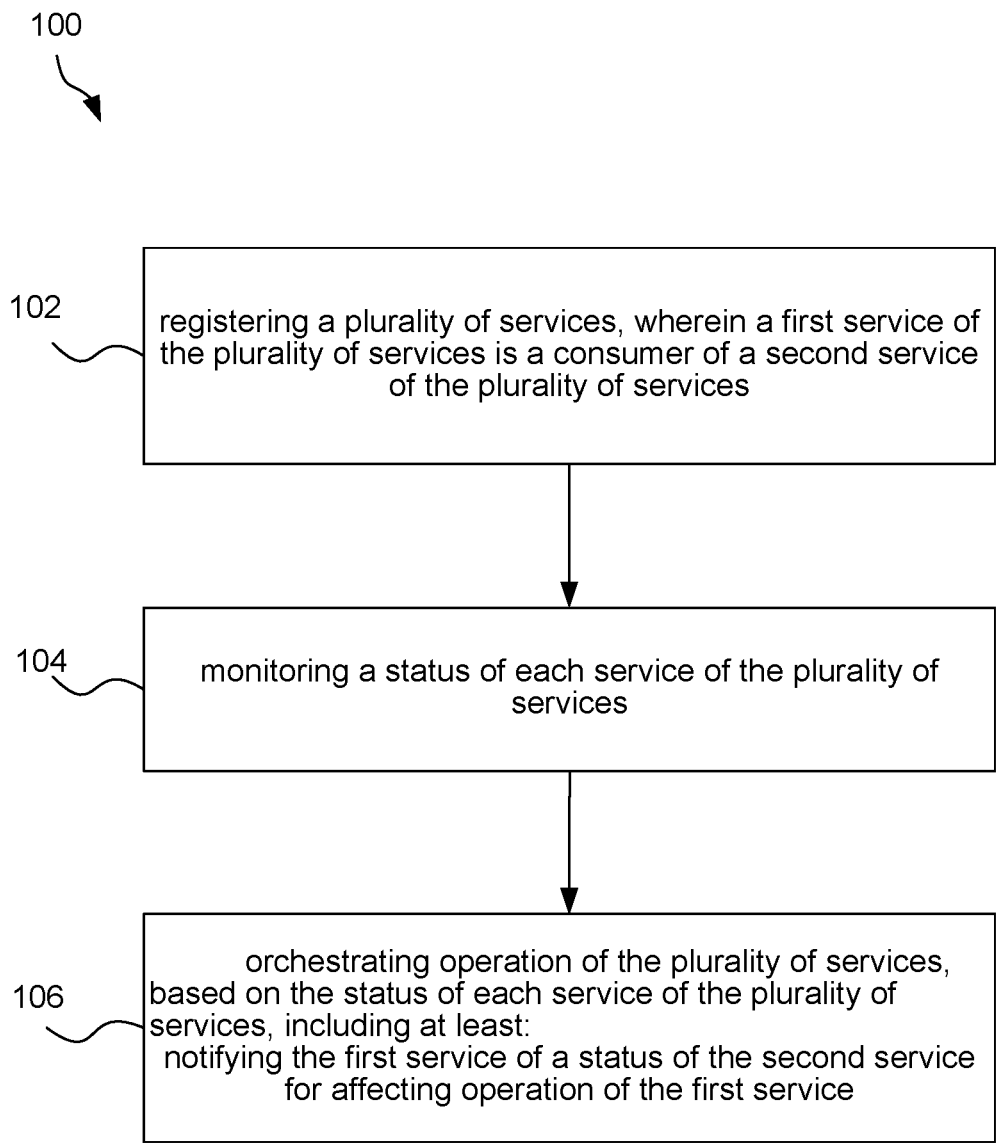
FIG. 1 illustrates a method for orchestrating loosely coupled services, in accordance with one embodiment.

FIG. 1 illustrates a method 100 for orchestrating loosely coupled services, in accordance with one embodiment. The method 100 may be performed by any computer system described below with respect to FIGS. 6 and/or 7. In one embodiment, as described in more detail below with reference to FIG. 2, the method 100 may be performed by an orchestration sub-system of the computer system. Optionally, the computer system may operate in the cloud to orchestrate services. The services may also be located in the cloud or may be externally located.

In operation 102, a plurality of services are registered, wherein a first service of the plurality of services is a consumer of a second service of the plurality of services. The services include any functionality that is executed for use by another service or an end point device. In one embodiment, each service may provide logic, such as business logic.

As noted above, a first one of the services is a consumer of a second one of the services. In other words, the first service consumes (e.g. uses, relies on, etc.) the second service. As a result, the first service is dependent on the second service. In one embodiment, the first service may implement a consumer application programming interface (API), which is used by the first service to connect to (and communicate with) the second service. Additionally, the second service may implement a provider API, which is used by the second service to connect to (and communicate with) the first service.

While the first service is described as being a consumer of only the second service, it should be noted that the first service may similarly be a consumer of additional services of the plurality of services. Likewise, the second service and/or any other ones of the services may also be consumers of one or more services of the plurality of services. To this end, complex dependencies between the plurality of services may exist.

Further, registration of the services may refer to establishing the services for use thereof. In one embodiment, registering the plurality of services may include, for each service, receiving a publish message from the service and metadata associated with the service. The metadata may include a unique name of the service, a description of the service, optional required services of the service, mandatory required services of the service, and/or any other information defining the service.

In operation 104, a status of each service of the plurality of services is monitored. In one embodiment, the services may publish their status to the computer system (e.g. orchestration sub-system). In another embodiment, the status of a service may be based on a lifecycle state of the service. For example, a newly registered service may be assigned a "not ready" status. As another example, a service that has connected to all of its required services may be assigned a "ready" status. "Not ready" may indicate that the service is not available for use (e.g. by other consumer services), such as when the service has not connected to all of its required services. "Ready" may indicate that the service is available for use.

In operation 106, operation of the plurality of services is orchestrated, based on the status of each service of the plurality of services, including at least notifying the first service of a status of the second service for affecting operation of the first service. In a general embodiment, responsive to registering each service of the plurality of services, required services of the service may be determined and those required services may be notified about the service. Further to this embodiment, a notification may be provided to the service indicating an availability of its required services. This notification may cause the service to connect to its required services that are available. The status of the service may then be changed to "ready" when the service has connected to its required services.

As noted above, orchestration of the plurality of services includes at least notifying the first service of a status of the second service for affecting operation of the first service. In one exemplary embodiment, the second service may be a mandatory required service of the first service (i.e. the first service cannot operate successfully without use of the second service, and will therefore fail). In this exemplary embodiment, notifying the first service of a not ready status of the second service may cause the first service to change its status to not ready. Also, notifying the first service of a not ready status of the second service may further cause the first service to stop using the second service, thereby avoiding a failure of the first service that would otherwise be caused by the first service unsuccessfully trying to connect to the second service and/or that would otherwise be caused by the first service being unable to operate successfully without use of the second service.

In another exemplary embodiment, the second service may be an optional required service of the first service (i.e. the first service can operate successfully without use of the second service). In this exemplary embodiment, notifying the first service of a not ready status of the second service may cause the first service to stop using the second service, thereby avoiding a failure of the first service that would otherwise be caused by the first service unsuccessfully trying to connect to the second service. However, the notification regarding the not ready status of the second service may not cause the first service to change its status to not ready, since the first service can operate successfully without use of the second service.

In yet another exemplary embodiment, notifying the first service of a ready status of the second service may cause the first service to connect to the second service. to this end, any status change of the second service may be communicated to the first service so that the first service can respond accordingly. By orchestrating the services according to the status of the services, especially where dependencies exist between the services, unnecessary failures and restarts of the services may be avoided, thus increasing up time for the whole services ecosystem.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
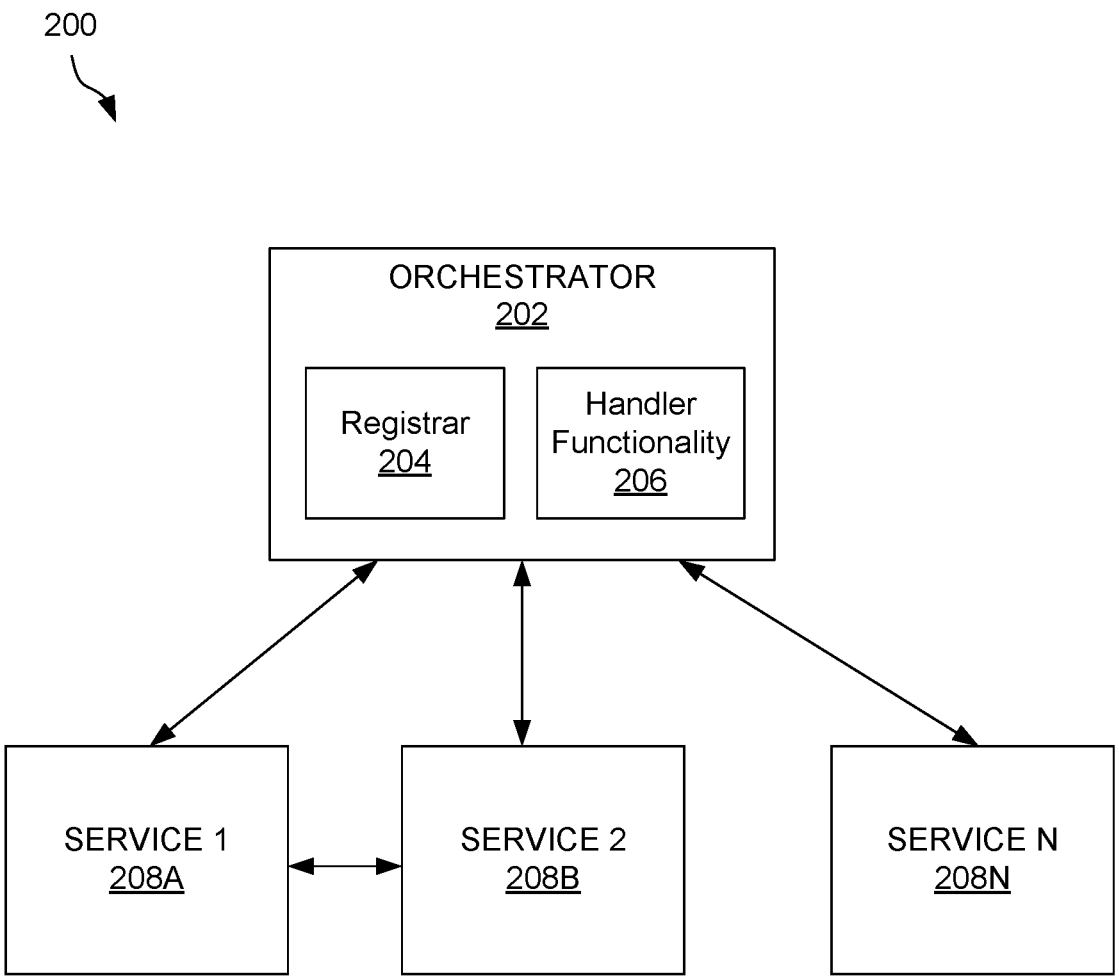
FIG. 2 illustrates a system flow diagram for orchestrating loosely coupled services, in accordance with one embodiment.

FIG. 2 illustrates a system 200 flow diagram for orchestrating loosely coupled services, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a orchestration sub-system 202. The orchestration sub-system 202 includes a registrar 204 which registers a plurality of services 208A-N with the orchestration sub-system 202. The registrar 204 may be created/started as part of a cluster deployment of services (e.g. using a Kubernetes service, a command-line interface, etc.).

In an embodiment, when the orchestration sub-system 202 receives a publish message from a new (unregistered) service, the registrar 204 registers the service with the orchestration sub-system 202. The publication message may include metadata associated with the service. In turn, registering the service may include storing the metadata associated with the service. Registration of a new service will be described in more detail below with reference to FIG. 3.

The orchestration sub-system 202 also includes handler functionality 206 that functions to monitor the status of each of the services 208A-N. The handler functionality 206 may periodically check the status of each of the services 208A-N, optionally using an external service (e.g. a Kubernetes service). In one embodiment, the services 208A-N may proactively report their statuses to the orchestration sub-system 202. In another embodiment, the orchestration sub-system 202 may poll the services 208A-N for their statuses. Absent receipt of a status report from any of the services 208A-N (e.g. within a specified period of time), the handler functionality 206 may assign a default status to the service 208A-N, which may be a not ready status.

The handler functionality 206 also functions to orchestrate operation of the services 208A-N. In one embodiment, the handler functionality 206 communicates with the services 208A-N to notify each of the services 208A-N of any changes in status to its required services. The services 208A-N themselves are capable of connecting with one another via their respective APIs (not shown), to coordinate their operation as required. The services 208A-N may include storage services, container services, API providers, etc. The services 208A-N may connect to their required services as they are notified by the handler functionality 206 that those required services have become available, and in turn may themselves be assigned a ready status. In another embodiment, the services 208A-N may disconnect from their required services as they are notified by the handler functionality 206 that those required services have become unavailable, and in turn may optionally be assigned a not ready status (e.g. where the unavailable required services are mandatory required services).

Figure 3:
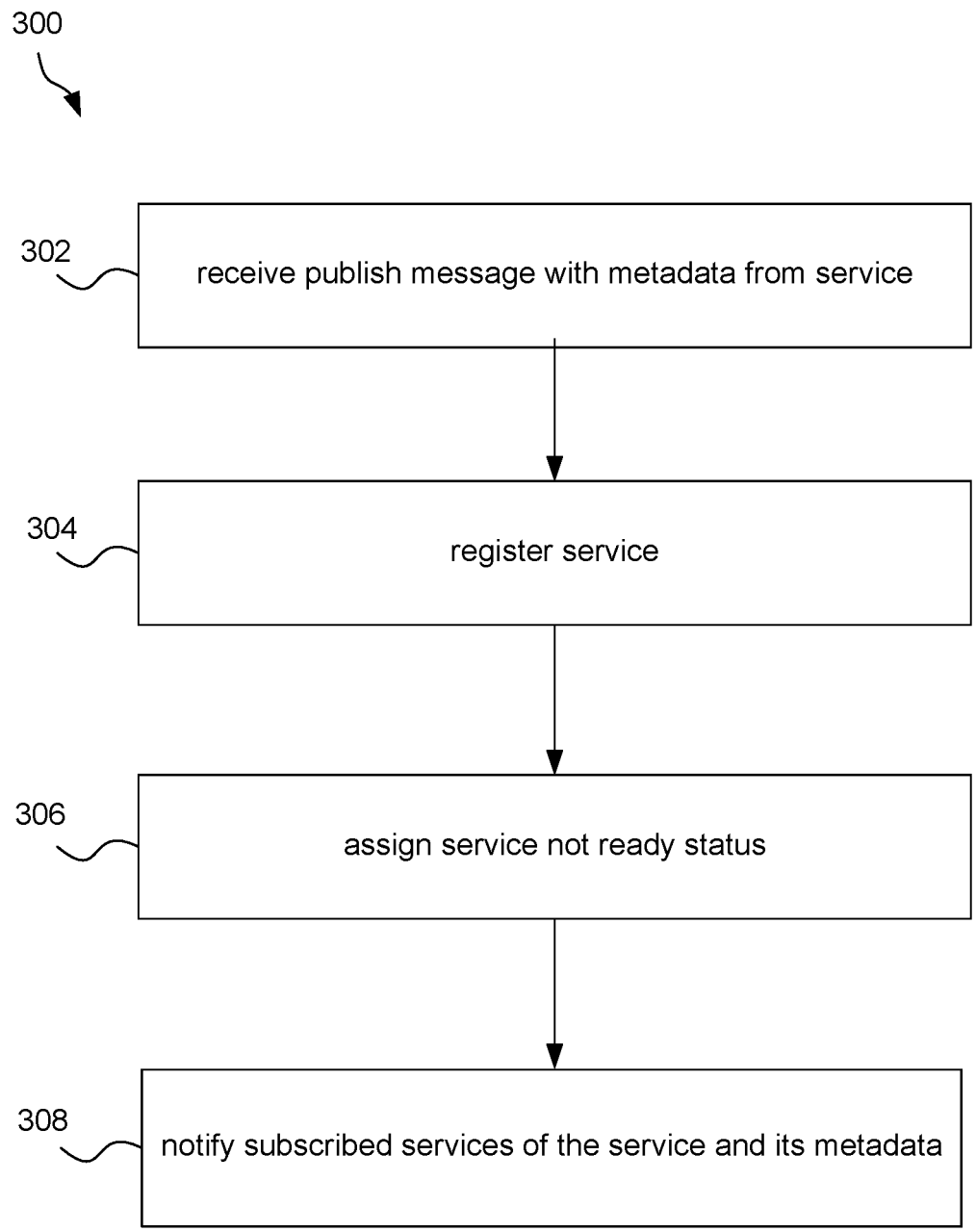
FIG. 3 illustrates a method for registering a service, in accordance with one embodiment.

FIG. 3 illustrates a method 300 for registering a service, in accordance with one embodiment. As an option, the method 300 may be carried out in the context of the details of the previous figure and/or any subsequent figure(s). For example, the method 300 may be carried out by the registrar 204 of the orchestration sub-system 202 of FIG. 2. Of course, however, the method 300 may be carried out in the context of any desired environment. Further, the aforementioned definitions may equally apply to the description below.

In operation 302, a publish message is received with metadata from a service. The service, at the time of receipt of the publish message, is an unregistered service. The metadata may include a unique name of the service, a description of the service, other services required by the service (e.g. optional and/or mandatory required services), etc.

In operation 304, the service is registered. In one embodiment, the metadata may be stored to register the service. In an embodiment where the service is an external service (e.g. MySQL, Kafka, etc.), the publish message may include a docker file configuration for the service. In this case, a bash script, cron job, etc. may be used with the docker file configuration to register the service.

In operation 306, the service is assigned a not ready status. In one embodiment, the service may be assigned the not ready status when the service requires one or more mandatory required services. The not ready status may be indicative of the service having not yet connected to its mandatory required service(s). On the other hand, while not shown, it should be noted that the service may be assigned a ready status when the service does not require one or more mandatory required services.

In operation 308, subscribed services are notified of the service. Subscribed services refer to other registered services that require (i.e. mandatory and optional) the service. These other registered services may be identified based on the metadata received by them during registration. In this way, the subscribed services may connect to the service once it is in a ready state.

Figure 4:
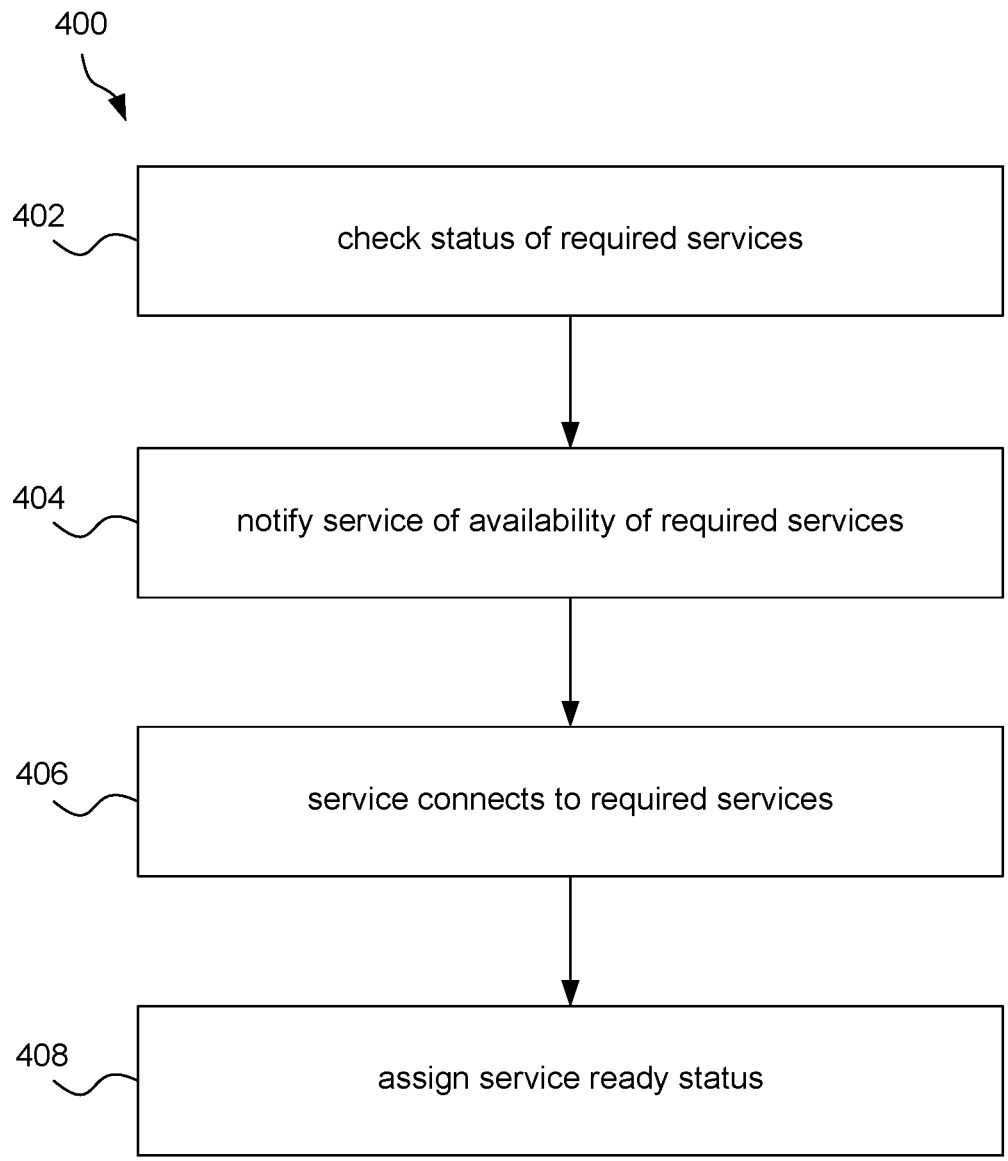
FIG. 4 illustrates a method for handling a service with a not ready status, in accordance with one embodiment.

FIG. 4 illustrates a method 400 for handling a service with a not ready status, in accordance with one embodiment. As an option, the method 400 may be carried out in the context of the details of the previous figure and/or any subsequent figure(s). For example, the method 400 may be carried out by the handler functionality 206 of the orchestration sub-system 202 of FIG. 2. Of course, however, the method 400 may be carried out in the context of any desired environment. Further, the aforementioned definitions may equally apply to the description below.

In operation 402, a status of a registered service's required services are checked. In the context of the present embodiment, the service is assigned a not ready status as a result of not having connections to all of its (mandatory) required services.

In operation 404, the service is notified of an availability of its required services. For example, based on a ready status of each of the required services, the service may be notified that its required services are available.

In operation 406, the service connects to its required services. The service may connect directly to its required services via one or more APIs of the service and respective APIs of the required services.

In operation 408, the service is assigned a ready status. The service may operate as intended, including using its required services as needed.

Figure 5:
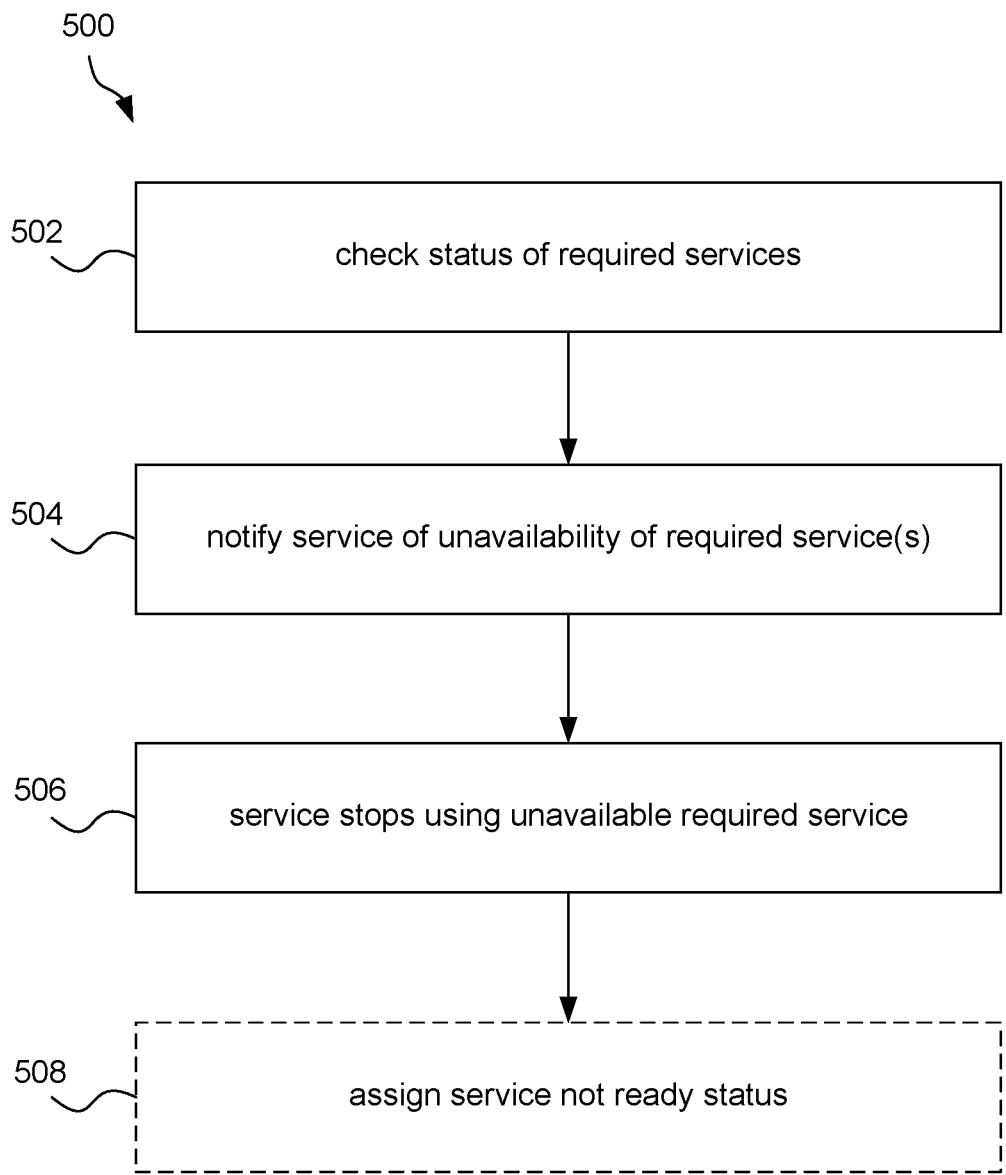
FIG. 5 illustrates a method for handling a service with a ready status, in accordance with one embodiment.

FIG. 5 illustrates a method 500 for handling a service with a ready status, in accordance with one embodiment. As an option, the method 500 may be carried out in the context of the details of the previous figure and/or any subsequent figure(s). For example, the method 500 may be carried out by the registrar 204 of the orchestration sub-system 202 of FIG. 2. Of course, however, the method 500 may be carried out in the context of any desired environment. Further, the aforementioned definitions may equally apply to the description below.

In operation 502, a status of a registered service's required services are checked. In the context of the present embodiment, the service is assigned a ready status as a result of having established connections to all of its (mandatory) required services.

In operation 504, the service is notified of an unavailability of one or more of its required services. For example, based on a not ready status of one or more of the required services, the service may be notified that the one or more of its required services are unavailable.

In operation 506, the service stops using the unavailable required service(s). This operation will ensure that the service avoids a failure otherwise caused by attempting to use an unavailable service. In an embodiment where the unavailable required service(s) include one or more mandatory required services, the service is assigned a not ready status (see operation 508). Alternatively, in an embodiment where all of the unavailable required services are optional required services, the service may maintain its ready status.

Figure 6:
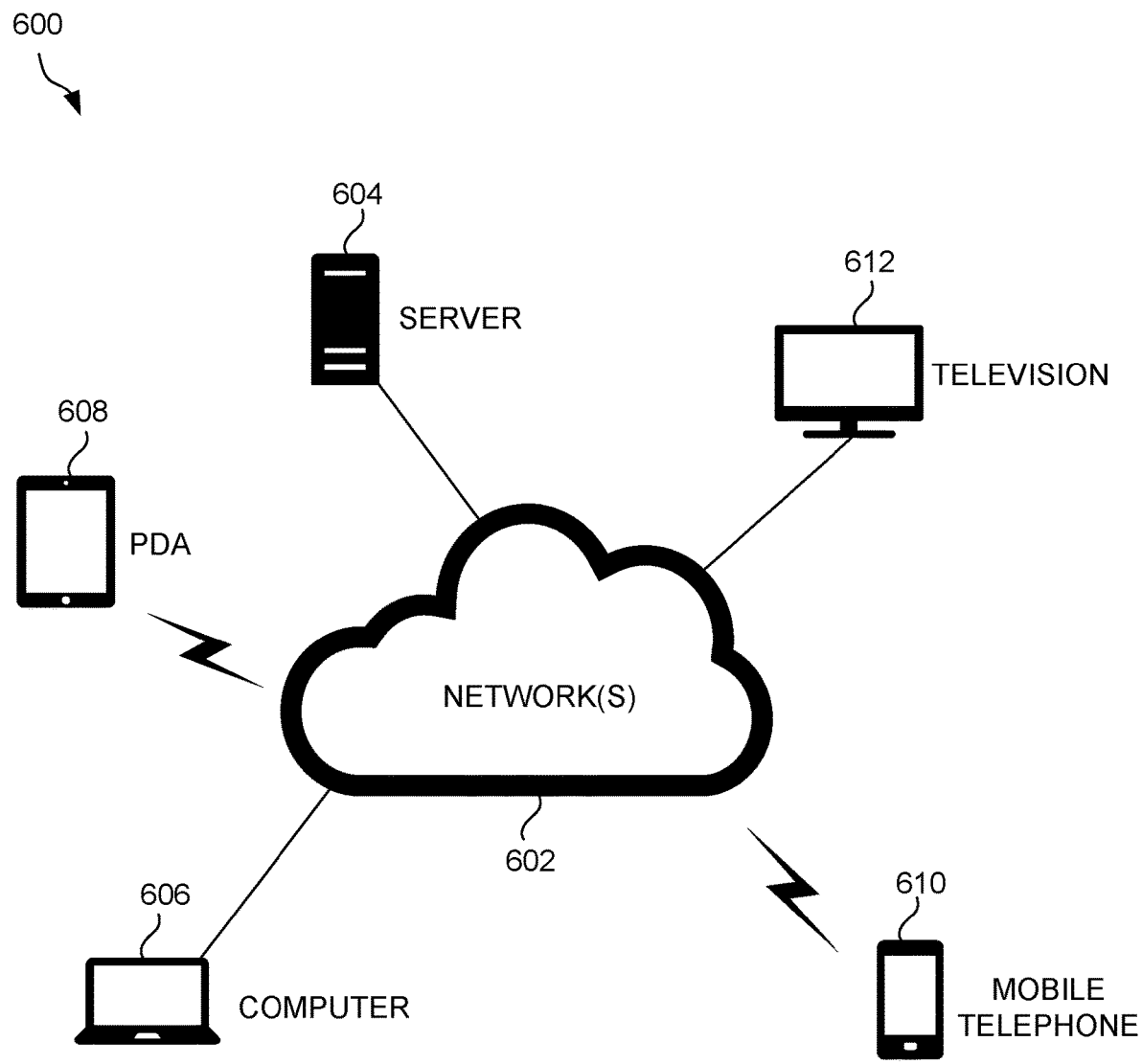
FIG. 6 illustrates a network architecture, in accordance with one possible embodiment.

FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 604 and an end user computer 606 may be coupled to the network 602 for communication purposes. Such end user computer 606 may include a desktop computer, lap-top computer, and/or any other type of logic. Still yet, various other devices may be coupled to the network 602 including a personal digital assistant (PDA) device 608, a mobile phone device 610, a television 612, etc.

Figure 7:
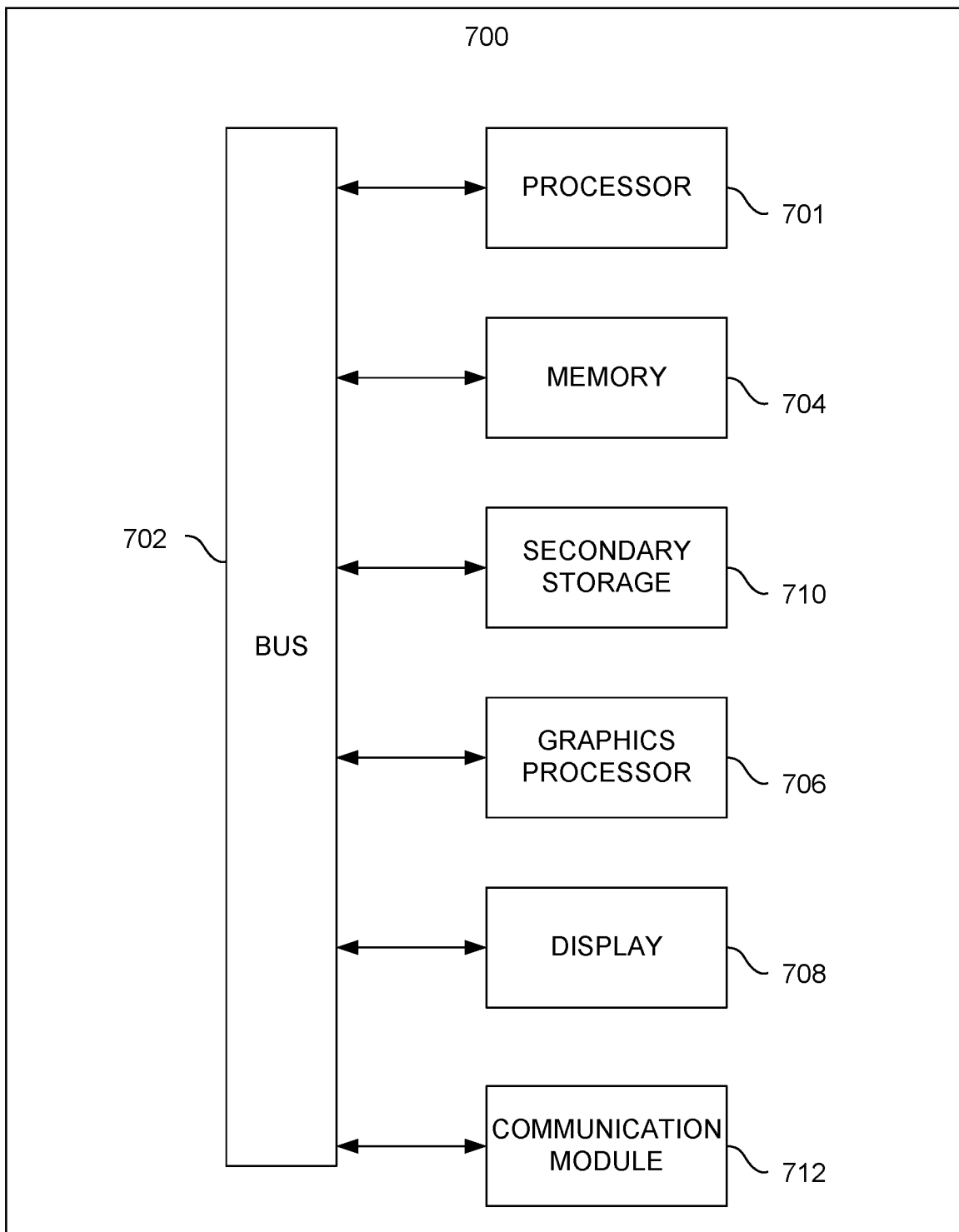
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 701 which is connected to a communication bus 702. The system 700 also includes main memory 704 [e.g. random access memory (RAM), etc.]. The system 700 also includes a graphics processor 706 and a display 708.

The system 700 may also include a secondary storage 710. The secondary storage 710 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 704, the secondary storage 710, and/or any other memory, for that matter. Such computer programs, when executed, enable the system 700 to perform various functions (as set forth above, for example). Memory 704, storage 710 and/or any other storage are possible examples of non-transitory computer-readable media.

The system 700 may also include one or more communication modules 712. The communication module 712 may be operable to facilitate communication between the system 700 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:

registering a plurality of services, wherein a first service of the plurality of services is a consumer of a second service of the plurality of services;

monitoring a status of each service of the plurality of services, wherein a ready status of a corresponding service of the plurality of services indicates that a connection to all required services of the corresponding service has been made by the corresponding service such that the corresponding service is available for use, and wherein a not ready status of the corresponding service of the plurality of services indicates that the connection to all required services of the corresponding service has not been made by the corresponding service such that the corresponding service is not available for use;

orchestrating operation of the plurality of services, based on the status of each service of the plurality of services, including at least:

notifying the first service of a status of the second service for affecting operation of the first service;

wherein notifying the first service of the not ready status of the second service causes the first service to stop using the second service, thereby avoiding a failure of the first service otherwise caused by the first service unsuccessfully trying to connect to the second service.

2. The non-transitory computer readable medium of claim 1, wherein each service of the plurality of services provides logic.

3. The non-transitory computer readable medium of claim 1, wherein the first service implements a consumer application programming interface (API).

4. The non-transitory computer readable medium of claim 1, wherein the second service implements a provider API.

5. The non-transitory computer readable medium of claim 1, wherein registering the plurality of services includes, for each service, receiving a publish message from the service and metadata associated with the service.

6. The non-transitory computer readable medium of claim 5, wherein the metadata includes:
a unique name of the service,
a description of the service,
optional required services of the service, and
mandatory required services of the service.

7. The non-transitory computer readable medium of claim 1, further comprising responsive to registering each service of the plurality of services:
determining required services of the service, and
notifying the required services about the service.

8. The non-transitory computer readable medium of claim 7, further comprising:
responsive to registering the service, assigning the not ready status to the service.

9. The non-transitory computer readable medium of claim 8, further comprising:
providing a notification to the service indicating an availability of its required services.

10. The non-transitory computer readable medium of claim 8, further comprising:
changing a status of the service to the ready status when the service connects to its required services.

11. The non-transitory computer readable medium of claim 1, wherein the second service is a mandatory required service of the first service.

12. The non-transitory computer readable medium of claim 11, wherein notifying the first service of the not ready status of the second service causes the first service to change its status to the not ready status.

13. The non-transitory computer readable medium of claim 1, wherein the second service is an optional required service of the first service.

14. The non-transitory computer readable medium of claim 13, wherein notifying the first service of the not ready status of the second service does not cause the first service to change its status to not ready, since the first service can operate successfully without use of the second service.

15. The non-transitory computer readable medium of claim 1, wherein notifying the first service of the ready status of the second service causes the first service to connect to the second service.

16. The non-transitory computer readable medium of claim 1, wherein monitoring the status of each service of the plurality of services includes receiving a status report from each service of the plurality of services indicating either the ready status or the not ready status, and wherein absent receipt of the status report from any particular service of the plurality of services within a specified period of time, the not ready status of assigned by default to the particular service.

17. A method, comprising:
at a computer system:
registering a plurality of services, wherein at one first service of the plurality of services is a consumer of at least one second service of the plurality of services;
monitoring a status of each service of the plurality of services, wherein a ready status of a corresponding service of the plurality of services indicates that a connection to all required services of the corresponding service has been made by the corresponding service such that the corresponding service is available for use, and wherein a not ready status of the corresponding service of the plurality of services indicates that the connection to all required services of the corresponding service has not been made by the corresponding service such that the corresponding service is not available for use; and
orchestrating operation of the plurality of services, based on the status of each service of the plurality of services, including at least:
notifying the first service of a status of the second service for affecting operation of the first service,
wherein notifying the first service of the not ready status of the second service causes the first service to stop using the second service, thereby avoiding a failure of the first service otherwise caused by the first service unsuccessfully trying to connect to the second service.

18. The method of claim 17, wherein the computer system includes an orchestration sub-system.

19. The method of claim 18, wherein the orchestration sub-system includes:
a registrar in which the plurality of services are registered, and
handler functionality for monitoring the status of each service of the plurality of services and orchestrating the operation of the plurality of services.

20. A system, comprising:
a non-transitory memory storing instructions; and
one or more processors in communication with the non-transitory memory that execute the instructions to:
register a plurality of services, wherein at one first service of the plurality of services is a consumer of at least one second service of the plurality of services;
monitor a status of each service of the plurality of services, wherein a ready status of a corresponding service of the plurality of services indicates that a connection to all required services of the corresponding service has been made by the corresponding service such that the corresponding service is available for use, and wherein a not ready status of the corresponding service of the plurality of services indicates that the connection to all required services of the corresponding service has not been made by the corresponding service such that the corresponding service is not available for use; and
orchestrate operation of the plurality of services, based on the status of each service of the plurality of services, including at least:
notifying the first service of a status of the second service for affecting operation of the first service,
wherein notifying the first service of the not ready status of the second service causes the first service to stop using the second service, thereby avoiding a failure of the first service otherwise caused by the first service unsuccessfully trying to connect to the second service.

\* \* \* \* \*